F. H. WILLIAMS.
Dumping Wagon.
No. 94,988.  Patented Sept. 21, 1869.
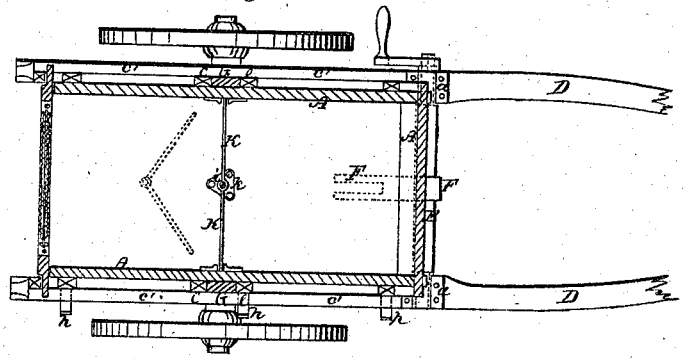
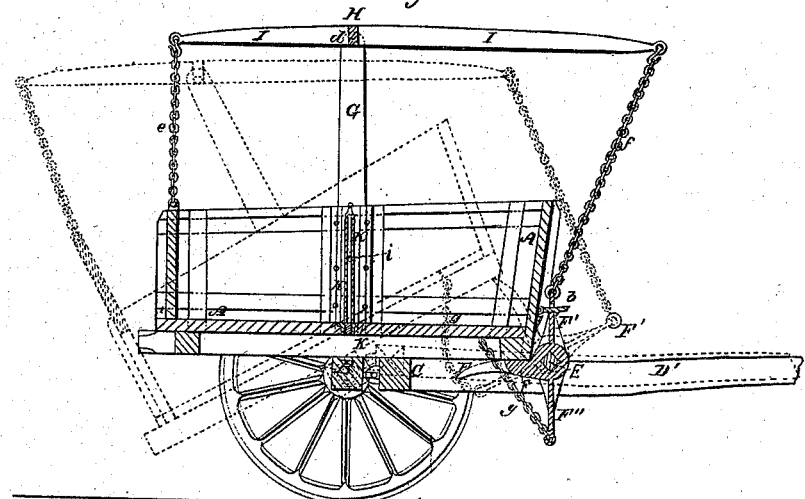
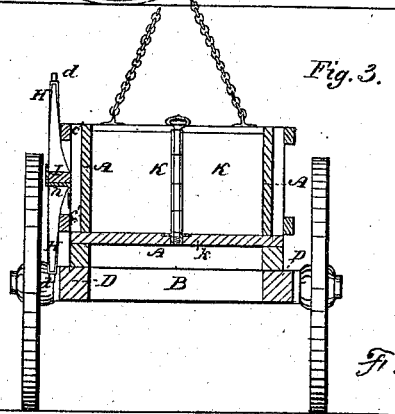
Witnesses.
Robert Lynch
Chas C Wilson
Inventor.
F. Hancock Williams

United States Patent Office.

F. HANCOCK WILLIAMS, OF WASHINGTON, DISTRICT OF COLUMBIA.

Letters Patent No. 94,988, dated September 21, 1869.

IMPROVED DUMPING-CART.

The Schedule referred to in these Letters Patent and making part of the same.

*To all whom it may concern:*

Be it known that I, F. HANCOCK WILLIAMS, of Washington, in the county of Washington, and District of Columbia, have invented a new and useful Improvement in "Dumping-Carts;" and I do hereby declare the following to be a full, clear, and exact description thereof, reference being had to the annexed drawing, making part of this specification, in which—

Figure 1 is a plan or top view;

Figure 2, a longitudinal section, showing the cart in two positions; and

Figure 3, a cross-section of my invention.

The object of my invention is to afford an easy and convenient manner of raising the tail-board and gradually tilting the body of a cart, for the purpose of "dumping" its load, without injury to any part thereof; as, for instance, when bricks are discharged by dumping, the ungoverned action of the cart in tilting projects the bricks violently to the ground and converts a large portion of them into "bats;" whereas, by my improvement, they may be gently and safely deposited where needed, with no risk of breakage.

It also has for its object the capability of carrying a divided load; thus, there may be two orders for coal, say for a quarter or half a ton each.

In my improved cart, both loads may be carried at the same time, and each be delivered without interfering with the other, while with a cart as commonly used, two trips would be required, or two separate loads.

In the drawings—

A is the body of a cart, constructed in the ordinary manner.

B is the axle, hinged to the cross-tie C of the shafts D D.

Resting on bearings at *a a* on the top of the shafts, across which it extends, and immediately in front of the cart-body, is a rock-shaft, E, fitted at one end to receive a crank or winch-handle for turning it.

On its centre, midway between the shafts, is firmly fixed the cam or wiper F, the toe of which extends under the front bottom rail of the cart-body, as seen in fig. 1, in blue lines, and in section, fig. 2.

The wiper F has two arms, F' F'', extending from it vertically in opposite directions, each terminating in an eye, whereby to hook or otherwise attach a chain or cord.

The upper arm F' has an opening through it, which takes a latch, *b*, hinged to the head-board of the cart, and held down by a spring, or by the weight of its head, for the purpose of keeping the body down upon the shafts until required to be lifted.

The rungs or standards G G are movable, and are held in place by the uprights *c c* of the body-frame.

They have bearing-notches at their upper ends, which support the journal-ends *d d* of the rocking-bar H.

Firmly attached to the centre of the rocking-bar, at right angles with it, is the lever I, furnished at each end with a hook for engaging a chain or cord.

The hook at the rear end of the lever catches a chain or cord, *e*, secured to the top of the tail-board, near its ends, while the hook at the front end is engaged with a chain or cord, *f*, extending upward from the arm F' of the wiper F.

The lower arm F'' is connected to the bottom of the cart by the chain or cord *g*.

When the vehicle is not to be used for dumping, the rock-bar, and lever H I may be detached from the wiper and tail-board and stowed along the outside of the cart on the hooks *h h*, and be held in place by the rails *c' c'* of the body-frame, (see fig. 3,) and the rungs G G may be disposed of in a similar manner.

K is a partition of two leaves hinged together with a tubular joint, extending across the middle of the cart-body from top to bottom, and is sustained in vertical grooves either cut into the sides of the cart, or formed of metal plates attached thereto, while the tubular joint is filled with a rod, *i*, furnished with a handle, which passes through it, and is screwed into the nut *k* in the bottom of the body, or is passed into a slot in a plate, *k*, instead of a nut, and then turned so as to be held firmly down, like a bayonet-lock.

The partition may also be stowed on the outside of the cart, when not required to divide a load.

When a load is to be "dumped," the rungs G G, rock-bar, and lever H I, are to be placed as shown in fig. 2, and the chains or cords from the wiper and tail-board hooked on, and the winch-handle fixed on the end of the rock-shaft E. The upper arm F' is freed from the latch *b*, and the cam or wiper F is turned so as to press against the under side of the body and lift it as the chain *g* slackens by the rising of the arm F''. At the same time, the arm F' is pulling down the front end of the lever I by the chain *f*, and causing the rear end of the lever to draw the tail-board out of its grooves by the chain *e*, so that the load may not be obstructed in its launch.

The position of the cart while "dumping" is shown by dotted lines in fig. 2.

By reversing the motion of the winch-handle, the arm F'' is made to draw upon the chain *g* and pull the body down, let the chain *f* slacken, and the tail-board slide into its place as the rear of the cart rises, when the body becomes fixed, by the catching of the latch *b*, in the arm F', or by the action of any equivalent device.

When the partition K is used in dividing a load, the rear load is "dumped" first, and when it is deemed expedient to remove the partition, the rod $i$ is disengaged from its fastening in the bottom of the cart, when the load in front of the partition will force its leaves to partially fold toward each other, as seen in dotted lines, fig. 1, and be released from the grooves in the sides of the cart, so that it may be lifted out of the cart and be disposed of, as required.

It will be evident that the dumping of a load may be effected as gently and gradually, as may be necessary.

Having thus fully described my invention,

What I claim as new therein, and desire to secure by Letters Patent, is—

1. The cam or wiper F, arm F″, and chain or cord $g$, when combined with the body of a cart, and arranged and operated substantially as and for the purpose set forth.

2. The cam F, arm F′, chains or cords $f$ $e$, and rock-bar and lever H I, in combination with the tail-board of a dumping-cart, substantially as described and for the purpose set forth.

3. The hinged partition K, secured by the rod $i$ and nut $k$, or their equivalent, when combined with the body of a dumping-cart, as specified.

F. HANCOCK WILLIAMS.

Witnesses:
T. C. CONNOLLY,
ROBERT LYNCH.